(12) United States Patent
Kolev

(10) Patent No.: US 7,446,075 B1
(45) Date of Patent: Nov. 4, 2008

(54) TRANSITION METAL PHOSPHIDES AND HYDROTREATING PROCESS USING THE SAME

(75) Inventor: Evgeny T. Kolev, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 651 days.

(21) Appl. No.: 11/209,458

(22) Filed: Aug. 23, 2005

(51) Int. Cl.
*B01J 27/14* (2006.01)
*B01J 27/185* (2006.01)
*B01J 27/186* (2006.01)
*C10G 17/095* (2006.01)

(52) U.S. Cl. .................... 502/208; 502/209; 502/210; 502/211; 208/208 R; 208/243; 208/244; 208/249; 208/254 R

(58) Field of Classification Search ............... 502/208, 502/209, 210, 211; 208/208 R, 243, 244, 208/249, 254 R See application file for complete search history.

(56) References Cited

U.S. PATENT DOCUMENTS 4,359,406 A * 11/1982 Fung .................. 502/200
4,454,246 A * 6/1984 Fung .................. 502/213

FOREIGN PATENT DOCUMENTS

WO WO 01/23501 A1 4/2001

* cited by examiner

*Primary Examiner*—Elizabeth D Wood
(74) *Attorney, Agent, or Firm*—Frank S Molinaro

(57) ABSTRACT

A catalyst for hydrotreating a hydrocarbon feed has been developed. The catalyst comprises a metal phosphide and promoter metal component as the catalytic component. At least a portion of the metal promoter component is deposited on the metal phosphide. The metal phosphide/promoter metal component combination is dispersed on a refractive inorganic oxide support. An example of this catalyst is where the metal phosphide is nickel phosphide, the promoter metal is molybdenum and the support is alumina. Methods of preparing the catalyst and hydrotreating processes using the catalyst are also described.

28 Claims, No Drawings

TRANSITION METAL PHOSPHIDES AND HYDROTREATING PROCESS USING THE SAME

FIELD OF THE INVENTION

This invention relates to a catalyst and a process for hydrotreating a hydrocarbon stream. The catalyst comprises a metal phosphide and a promoter metal component wherein at least a portion of the promoter metal component is present on the metal phosphide and the metal phosphide/promoter metal catalytic components are dispersed on a refractory inorganic oxide support. The hydrotreating process involves contacting the catalyst with a hydrocarbon stream at hydrotreating conditions thereby removing at least a portion of the contaminants, e.g. sulfur compounds present in the stream and providing a purified hydrocarbon stream.

BACKGROUND OF THE INVENTION

The removal of sulfur compounds from various hydrocarbon streams and especially gasoline and diesel streams is becoming more critical with the introduction of legislation limiting the amount of sulfur in such streams. The most common way of removing the bulk of the sulfur present in various hydrocarbon streams is hydrodesulfurization (HDS) which involves contacting the stream with a hydrodesulfurization catalyst in the presence of hydrogen at elevated temperatures and pressure. HDS is part of an overall process commonly referred to as hydrotreating. Hydrotreating includes HDS, hydrodenitrogenation (HDN) and hydrogenation (HYD). Hydrogenation (HYD) can be an undesirable reaction during hydrotreating.

Catalysts which are commonly used for hydrotreating and HDS in particular include those with molybdenum or tungsten as the active species in combination with other transition metal compounds such as nickel or cobalt. Usually these catalysts are dispersed on some type of support in order to maximize the effectiveness of the metals. Additionally, other additives such as phosphorus can be incorporated into the support either to stabilize the surface area of the support or to prevent formation of compounds such as cobalt or nickel aluminate.

WO 01-23501 A1 discloses the use of transition metal phosphide catalysts for hydrodesulfurization processes. The catalyst is described as a metal phosphide complex having the formula MP, where M is selected from the group consisting of V, Cr, Mn, Fe, Co, Ni, Nb, Mo, Ta and W, and "x" ranges from 0.1 to about 10. This metal phosphide catalyst is supported on a high surface area support. The catalyst can also be a mixed metal phosphide having the formula $A_aB_bP_y$, where A and B are each selected from the group described above, the sum of a and b is 1, the ratio of a:b is between 0.01 and 100 and y is between 0.1 and 10.

In contrast to this, applicants have developed a catalyst comprising a metal phosphide and a promoter metal component and where at least a portion of the promoter metal component is present on the metal phosphide and the metal phosphide/promoter metal components are dispersed on a refractory inorganic oxide support. The catalyst is capable of removing sulfur and nitrogen compounds from various hydrocarbon streams with less hydrogenation of unsaturated or aromatic components.

SUMMARY OF THE INVENTION

One embodiment of the invention is a catalyst for hydrotreating a hydrocarbon stream comprising a metal phosphide where the metal (M) is selected from the group consisting of Ni, Co, Fe, Mn, Cr, V, Nb, Mo, Ta, W and mixtures thereof, and a promoter metal component where the metal promoter (M1) is selected from the group consisting of Ni, Co, Fe, Mn, Cr, V, Nb, Mo, Ta, W and mixtures thereof and where M is not the same as M1 and wherein at least a portion of the M1 promoter metal component is present on the M metal phosphide and the metal phosphide/promoter metal component are dispersed onto a refractory inorganic oxide support.

Another embodiment of the invention is a process for preparing the catalyst described above. The process comprises preparing a metal phosphide by mixing red phosphorus with a M metal compound, a diamine or a polar organic solvent and optionally a surfactant to provide a mixture and reacting the mixture at reaction conditions to provide a metal phosphide; impregnating the metal phosphide with a solution comprising a M1 metal compound and drying to provide a metal phosphide/promoter metal catalytic component and dispersing the catalytic component onto a refractory inorganic oxide support by preparing a slurry of the catalytic component coating the support with the slurry followed by calcination at a temperature of about 80° C. to about 350° C. for a time of about 2 to about 24 hours.

Yet another embodiment is an alternate process for preparing the above described catalyst. The process comprises preparing a metal phosphide by mixing red phosphorus with a M metal compound, a diamine or a polar organic solvent and optionally a surfactant to provide a mixture and reacting the mixture at reaction conditions to provide a metal phosphide; dispersing the metal phosphide onto a refractory inorganic oxide support by preparing a slurry of the metal phosphide and coating the support with the slurry followed by calcination at a temperature of about 80° C. to about 350° C. for a time of about 2 to about 24 hours; impregnating the metal phosphide/support with a solution comprising a M1 metal compound and drying to provide the catalyst.

A further embodiment of the invention is a process for hydrotreating a hydrocarbon stream comprising sulfur and nitrogen compound contaminants comprising contacting the hydrocarbon stream with a catalyst at hydrotreating conditions thereby removing at least a portion of the contaminants and providing a purified hydrocarbon stream, the catalyst comprising a metal phosphide where the metal (M) is selected from the group consisting of Ni, Co, Fe, Mn, Cr, V, Nb, Mo, Ta, W and mixtures thereof, and a promoter metal component where the metal promoter (M1) is selected from the group consisting of Ni, Co, Fe, Mn, Cr, V, Nb, Mo, Ta, W and mixtures thereof and where M is not the same as M1 and wherein at least a portion of the M1 promoter metal component is present on the M metal phosphide and the metal phosphide/promoter metal component are dispersed onto a refractory inorganic oxide support.

These and other objects and embodiments will become clearer after the detailed description of the invention.

DETAILED DESCRIPTION OF THE INVENTION

As stated the present invention relates to a catalyst, a method of preparing the catalyst and a hydrotreating process using the catalyst. The catalyst comprises a metal phosphide where the metal (M) is selected from the group consisting of Ni, Co, Fe, Mn, Cr, V, Nb, Mo, Ta, W and mixtures thereof, and a promoter metal component where the promoter metal (M1) is selected from the group consisting of Ni, Co, Fe, Mn, Cr, V, Nb, Mo, Ta, W and mixtures thereof. M is not the same as M1 and at least a portion of the M1 promoter metal component is present on the M metal phosphide. The metal phosphide/promoter metal component are dispersed on a refractory inorganic oxide support. As will be shown in detail below, the promoter metal component can be a metal compound or a metal oxide.

The metal phosphide is prepared by mixing red phosphorus with a M metal compound, a diamine or a polar solvent and optionally a surfactant to provide a mixture. The M metal compounds which can be used include but are not limited to the halides, nitrates, sulfates, and acetates, of M. Examples of the diamines include but are not limited to ethylene diamine and 1,3-propylene diamine. Optionally, a surfactant can be added, examples of which include but are not limited to polyacryl amide, sodium dodecylsulfate, and cetyltrimethylammonium bromide. The diamine acts as the solvent and therefore no other solvents are necessary. Instead of a diamine, a polar solvent can be used in forming the desired phosphides. Examples of polar solvents include but are not limited to methanol, ethanol, etc. The resulting slurry is reacted at a temperature of about 165° C. to about 200° C. for a time of about 3 to about 24 hours. The reaction may take place under static or stirred conditions. In the latter case the increased pressure of the vessel can be controlled by the reaction time or by the ratio of the components and their total volume. The control of the time and pressure can be used as a way for tuning the particle size of the product. The solid product is isolated from the reaction mixture by means well known in the art such as filtering, centrifuging etc. The solid product is usually washed and then dried at a temperature of about 100° C. to about 150° C.

Having obtained the metal phosphide, it can now be impregnated with a M1 compound. The impregnation is carried out by means well known in the art such as spray drying, incipient wetness, etc. One method involves mixing the metal phosphide with a solution (preferably aqueous) of a decomposable compound of the M1 metal or metals. By decomposable is meant that upon heating the metal compound is converted to the metal or metal oxide with the release of byproducts. Examples of the M1 compounds which can be used include without limitation halides, nitrates, hydroxides, acetates, and sulfates.

One impregnation procedure involves the use of a steamed jacketed rotary dryer. The metal phosphide is immersed in the impregnating solution containing the desired M1 metal compound contained in the dryer and the metal phosphide is tumbled therein by the rotating motion of the dryer. Evaporation of the solution in contact with the tumbling metal phosphide is expedited by applying steam to the dryer jacket. The resultant composite is allowed to dry under ambient temperature conditions or dried at temperatures of about 80 to about 140° C. The drying can optionally be followed by calcination at a temperature of about 250° C. to about 350° C. for a time of about 2 to about 24 hours. Depending on the particular M1 metal, after calcination, the M1 oxide may be formed or the M1 metal compound can still remain. In those cases where no calcination is carried out, the M1 metal compound is the species which is deposited on the metal phosphide.

The metal phosphide/promoter metal component combination (herein referred to as catalytic component) can now be dispersed unto a refractory inorganic oxide support by preparing a slurry of the catalytic component and coating the support with the slurry followed by calcination to provide the catalyst. The solvent which is used to prepare the slurry is usually water although organic solvents may also be used. The catalytic component is dispersed in the solvent by means such as milling, sonification, and reflux boiling for a sufficient time to form a slurry. The slurry is now contacted with the refractory inorganic oxide support which can be in the shape of a powder, or specific shapes such as spheres, extrudates, pills, pellets, tablets or irregularly shaped particles. Examples of the refractory inorganic oxide support include but are not limited to silica, alumina, silica-alumina, titania, zirconia, magnesia, clays, zeolites, molecular sieves, etc. It should be pointed out that silica-alumina is not a mixture of silica and alumina but means an acidic and amorphous material that has been cogelled or coprecipitated. Of course mixtures of refractory oxides can be used. The contacting of slurry and support can be done by simple admixture or means such as spraydrying. The slurry can also contain surfactants or other additives which will aid both forming a good bond with the support and coating the support. Examples of these surfactants include but are not limited to polyacryl amide, sodium dodecylsulfate, and cetyltrimethylammonium bromide. In addition the pH of the solution can be adjusted to optimize the electrostatic interaction between the support and the slurry. Experiments to determine the isoelectric point of the two can be done to find the optimum for the specific system.

In the case where the catalytic component is dispersed on a powdered support to form the catalyst, the catalyst can be formed into a shaped catalyst by forming a dough and then extruding the dough into various shapes, e.g. extrudates, pills, pellets, tablets etc. To help in forming the dough and increase strength, binders can be added. Examples of binders which can be used include without limitation silica, alumina, silica-alumina, titania, zirconia, magnesia, clays, zeolites and mixtures thereof. Once the shaped catalyst is formed, it is dried and then calcined at a temperature of about 200° C. to about 400° C. for a time of about 2 to about 24 hours. The amount of binder can vary widely from about 10 wt. % to about 90 wt. % of the total catalyst weight.

Instead of impregnating the metal phosphide powder with a M1 metal compound, the metal phosphide powder can be slurried as described above and supported onto a refractory inorganic oxide support as described for the catalytic component above. Once the metal phosphide has been supported onto the refractory inorganic oxide support, the resultant mixture can now be impregnated with a M1 metal compound in an appropriate solvent such as water as described above to provide a promoter metal component on the metal phosphide and on the support. The process of impregnating the metal phosphide and then dispersing the catalytic component onto the support is preferred. Regardless of how the metal promoter is dispersed on the catalyst, it is present in an amount from about 0.1 wt. % to about 10 wt. % of the total catalyst weight expressed as the metal. The metal phosphide is present in the catalyst in an amount from about 0.1 to about 10 wt. % of the catalyst as the metal.

In yet another approach, the catalytic component powder can be used in incorporation in mesoporous materials. Mesoporous materials such as MCM-41, APMS-30, etc. can be synthesized with the addition of the catalytic component powder in the reaction slurry by methods well described in the literature. Finally, it should be pointed out that the metal promoter component can be dispersed on a support and then the metal phosphide is dispersed on the support, although this method of preparing a catalyst is not preferred.

The catalysts described above can be used in a hydrotreating process whereby sulfur and nitrogen compounds are removed from various hydrocarbon streams. These streams include atmospheric and vacuum gas oils. Examples of the sulfur compounds include mercaptans, aromatic heterocyclic compounds, sulfides and disulfides. Relative amounts of each type of compound depend on a number of factors many of which are refinery, process and feed specific. In general, heavier fractions contain a larger amount of sulfur compounds and a larger fraction of the sulfur compounds are aromatic heterocyclic compounds. Streams containing significant amounts of heterocyclic compounds are difficult to process because they require very severe operating conditions resulting in the hydrogenation of both unsaturated and aromatic components thereby reducing the octane number of the purified stream.

The aromatic heterocyclic compounds which are usually found in the various hydrocarbon streams include alkane-substituted thiophene, dibenzothiophene, thiophenol and benzothiophene. Specific examples of these include without limitation thiophene, 2-methyl thiophene, 3-methyl thiophene, 2-ethyl thiophene, 4,6 dimethyldibenzothiophene, benzyl thiophene and dimethylbenzothiophene. The total sulfur content of the streams to be desulfurized by the catalyst of the present invention will generally exceed 50 ppm by weight and typically range from about 150 ppm to as much as several thousand ppm sulfur.

Hydrotreating operating conditions preferably include a hydrogen to hydrocarbon ratio of about 0.02 to about 0.04 (wt/wt), a reaction temperature from about 149° C. (300° F.) to about 399° C. (750° F.) a reaction pressure from about 0.3 MPa (50 psig) to about 5.2 MPa (750 psig) and a liquid hourly space velocity (LHSV) of about 1 to about 2 $hr^{-1}$. The hydrotreating process is carried out by first preheating the charge stock to be treated in a feed-effluent heat exchanger prior to entering a fired furnace for final preheating to a targeted reaction zone inlet temperature. The feedstock can be contacted with a hydrogen-rich gaseous stream prior to, during or after preheating. The hydrogen-rich stream may also be added in the hydrotreating reaction zone. The hydrogen stream can be pure hydrogen or can be diluted with other components found in refinery hydrogen streams. It is preferred that the hydrogen stream have little if any hydrogen sulfide. The hydrogen stream purity is preferably at least about 65 volume percent hydrogen and more preferably at least 75 volume percent hydrogen for best results.

The hydrotreating reaction zone can consist of one or more fixed bed reactors each of which can comprise a plurality of catalyst beds. Since the desulfurization reaction and other reactions such as olefin saturation are generally exothermic, interstage cooling between the bed reactors or between catalyst beds in the same reactive shell can be employed. A portion of the heat generated from the hydrotreating process can be recovered and where this option is not available, cooling may be achieved by heat exchange with the hydrogen quench stream, air or cooling water.

During the hydrotreating process the sulfur contained in the feed will be converted to hydrogen sulfide and any nitrogen compounds present therein will be converted to ammonia, which may be separated and recovered from the resulting purified hydrocarbons by means of scrubbing with water, amine or any other convenient scrubbing medium. In addition, since hydrogen is a reactant in the hydrotreating reaction and is therefore consumed, sufficient makeup hydrogen is introduced to supply the reactant and to maintain the reaction zone pressure.

The following examples are presented in illustration of this invention and are not intended as undue limitations on the generally broad scope of the invention as set out in the appended claims.

EXAMPLE 1

Preparation of $Ni_2P/(Mo/Al_2O_3)$

The phosphide powder was prepared as follows: nickel chloride and red phosphorus were mixed; then polyacrylamide was added in weight ratio P:polyacrylamide 3.5:1. The vessel was filled with ethylenediamine resulting in the molar ratio Ni:P:en=1:11:70. The reaction took place in a stirred reactor at 180° C. for 4 hours. The formed powder was filtered and dried overnight at room temperature. The powder X-ray diffraction of the product matched that of $Ni_2P$, PDF 03-0953. A slurry was prepared from the nickel phosphide powder in water and was sonicated with ultrasonic probe for 30 minutes. Then it was added to a support prepared by the impregnation of ammonium heptamolybdate on alumina, followed by calcination of 300° C. for 2 hours in air. The $Ni_2P$ and $Mo/Al_2O_3$ water based slurry was placed covered on a hot plate and evaporated to dryness with occasional stirring. The resulting product was dried at 100° C. for 24 hours. This sample was identified as sample A.

EXAMPLE 2

Preparation of $(Mo/Ni_2P)/Al_2O_3$

Some of the nickel phosphide described in Example 1 was impregnated with ammonium heptamolybdate solution then dried at 50° C. for 19 hours and finally calcined at 300° C. for 2 hours. Next, the resulting material was suspended in 2-propanol-methanol-water solution (1:1.5:1 by weight) and meshed gamma alumina was added. The slurry was covered and placed on a heating plate at a low temperature setting of 50-60° C. More water was added after 12 hours and the content of the beaker was reslurried. The heating continued for a total of 44 hours. In the final step the solid was dried at 120° C. for 24 hours in air filled oven. This sample was identified as sample B.

A second sample was also prepared using the above procedure with approximately half of the metal loading of the first catalyst as is shown in Table 2. This sample was identified as sample C.

EXAMPLE 3

Preparation of $Mo/(Ni_2P/Al_2O_3)$

The nickel phosphide powder from Example 1 was suspended in 2-propanol-methanol-water solution (1:1.5:1 by weight) and meshed gamma alumina was added. The $Ni_2P/Al_2O_3$ mixture was dried in about 24 hours to dryness. The molybdenum was next added by impregnation with a water based ammonium heptamolybdate solution. The resulting slurry was heated while covered and occasionally stirred to dryness slowly for about 30 hours. There was no calcination step involved in this example. This sample was identified as sample D.

EXAMPLE 4

Preparation of $(Mo/Co_xP)/Al_2O_3$

Cobalt phosphide was prepared by mixing cobalt chloride hexahydrate, red phosphorus, polyacrylamide and ethylenediamine in the ratio 1:11:3.5:70. The slurry was loaded in a pressure vessel and heated at 180° C. for 24 hours in a tumbled oven. The powder isolated from the reaction mixture was impregnated with ammonium hexamolybdate, dried at 60° C. and then calcined at 300° C. for 2 hours. The resulting material was suspended in a water-ethanol solution (1:1) and added to a gamma alumina support. The resulting slurry was heated while covered at 50-60° C. and occasionally stirred to dryness for about 30 hours. Finally, the catalyst was dried at 120° C. in an oven for 5 days. This sample was identified as sample E.

EXAMPLE 5

Preparation of Mo/(Ni$_2$P/MgO)

A nickel phosphide powder prepared as in example 1, was supported on a magnesium oxide support after sonication in water for 45 minutes. The slurry was covered and heated on a hot plate at 50-60° C. to dryness. The resulting material was further dried at 100° C. for 12 hours. A water solution of ammonium heptamolybdate was added and once again allowed to evaporate slowly with occasional stirring. The final catalyst was dried at 100° C. for 10 hours. Similarly to Example 3, the preparation of this catalyst did not include a calcination step. This sample was identified as sample F.

EXAMPLE 6

Hydrotreating Activities

The catalysts were tested in a pressurized three-phase trickle bed reactor using a model feed described in Table 1 below.

TABLE 1

| Feed Composition | | |
|---|---|---|
| Paraffin | NorPar ™ C15 centered feed* | 70% |
| Aromatic compounds | Tetraline | 15% |
| | Naphthalene | 10% |
| | 2-methyl naphthalene | 5% |
| Nitrogen compounds | | 100 ppm |
| basic nitrogen | Quinoline | 80 ppm |
| non-basic nitrogen | Carbazole | 20 ppm |
| Sulfur compounds | | 500 ppm |
| non-steric | Dibenzothiophene | 420 ppm |
| steric | 4,6-Dimethyldibenzothiophene | 80 ppm |

*Obtained from Exxon Mobil

Analyses of the liquid product were done hourly with a gas chromatograph. The catalyst was diluted with white quartz sand in volumetric ratio 1:1.8 before loading into the reactor. After drying with nitrogen, the sample was sulfided at 370° C. using H$_2$S/H$_2$ mixture (10 vol % H$_2$S) for 2 hours at atmospheric pressure. The temperature was brought down and the above described feed was introduced. The test was done in the temperature range 150-350° C., at 5.2 MPa (750 psig), with an H$_2$ flow rate of 119 cm$^3$/min and a liquid feed rate of 0.3 cm$^3$/min. Results from the test are listed in Table 2 below. The hydrogenation activity was monitored by the conversion of the aromatic components in the feed. The conversion of naphthalene goes in two stages: 1) partially to tetralin, which is also a component of the feed; and 2) complete to decalin:

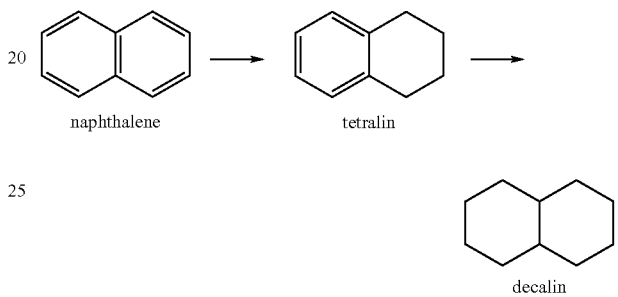

The presence of decalin in the products is indicative of a more complete hydrogenation, while its absence shows a partial hydrogenation activity. Hence, a function representing the degree of hydrogenation can be defined as follows:

$$D\% = 100\% \times \frac{D}{D + N + T}$$

where D, N and T represent the concentration of decalin, naphthalene and tetralin, respectively.

TABLE 2

| | | Hydrotreating Activity at 300° C. and 350° C. | | | | | |
|---|---|---|---|---|---|---|---|
| Sample I.D. | Metal Wt. % | 4,6-DMDBT* | DBT* | Napht.* | D | Quin.* | Carb.* |
| | | Conversion (%) at 300° C. | | | | | |
| A | 8.7 | 10.4 | 60.1 | 45.3 | 1.2 | 74.6 | 32.9 |
| B | 9.5 | 58.9 | 99.7 | 98.1 | 11.9 | 61.5 | 100 |
| C | 5.0 | 17.8 | 98.4 | 68.0 | 2.7 | 70.7 | 68.3 |
| D | 10.9 | 31.1 | 97.6 | 88.1 | 12.9 | 59.6 | 92.5 |
| E | 4.8 | 33.0 | 89.7 | 27.8 | 1.0 | 77.4 | 31.7 |
| F | 9.5 | 24.9 | 17.2 | 13.6 | 0.5 | 88.5 | 24.5 |
| Reference[1] | 17.5 | 97.7 | 99.5 | 99.2 | 47.4 | 75.7 | 100 |
| | | Conversion (%) at 350° C. | | | | | |
| A | 8.7 | 78.7 | 99.1 | 91.8 | 4.6 | 45.8 | 100 |
| B | 9.5 | 100 | 99.9 | 94.0 | 35.4 | 67.1 | 100 |
| C | 5.0 | 91.2 | 99.7 | 94.6 | 9.8 | 50.2 | 100 |
| D | 10.9 | 100 | 100 | 94.2 | 20.1 | 68.8 | 100 |

TABLE 2-continued

Hydrotreating Activity at 300° C. and 350° C.

| Sample I.D. | Metal Wt. % | 4,6-DMDBT* | DBT* | Napht.* | D | Quin.* | Carb.* |
|---|---|---|---|---|---|---|---|
| E | 4.8 | 72.2 | 100 | 83.3 | 4.6 | 58.2 | 100 |
| F | 9.5 | 80.3 | 92.8 | 76.9 | 1.8 | 62.6 | 78.8 |
| Reference[1] | 17.5 | 100 | 99.4 | 94.9 | 58.2 | 61.7 | 100 |

*4,6-DMDBT is 4,6 dimethyldibenzothiophene
DBT is dibenzothiophene
Napht. is naphthalene
Quin. is quinoline
Carb. is carbazole
[1]The reference catalyst was obtained from UOP LLC and contained 15.2% Mo, 2.61% Ni and 1.21% P.

The results presented in Table 2 show that at 300° C., the catalysts of the invention have comparable activity to the reference for DBT, carbazole and quinoline but lower 4,6 DMDBT conversion, although the catalysts of the invention have a lower metal content. Also, the catalysts of the invention have lower hydrogenation activity (D) than the reference which is desirable. At 350° C., the catalysts of the invention also have comparable activity in 4,6 DMDBT conversion while still having lower HYD conversion (D).

What is claimed is:

1. A catalyst for hydrotreating a hydrocarbon stream comprising a metal phosphide where the metal (M) is selected from the group consisting of Ni, Co, Fe, Mn, Cr, V, Nb, Mo, Ta, W and mixtures thereof, and a promoter metal component where the metal promoter (M1) is selected from the group consisting of Ni, Co, Fe, Mn, Cr, V, Nb, Mo, Ta, W and mixtures thereof and where M is not the same as M1 and wherein at least a portion of the M1 promoter metal component is present on the M metal phosphide and the metal phosphide/promoter metal component are dispersed onto a refractory inorganic oxide support.

2. The catalyst of claim 1 where the M1 promoter metal component is present as the M1 metal oxide.

3. The catalyst of claim 1 further comprising a binder and agglomerated in the form of a shaped catalyst.

4. The catalyst of claim 1 where M is selected from the group consisting of Co, Ni, Fe and mixtures thereof and M1 is selected from the group consisting of Mo, W and mixtures thereof.

5. The catalyst of claim 1 where the refractory inorganic oxide is selected from the group consisting of alumina, silica, silica-alumina, titania, zirconia, magnesia, clays, zeolites and mixtures thereof.

6. The catalyst of claim 1 where the metal phosphide is present in an amount from about 0.1 to about 10 wt. % of the catalyst as the metal.

7. The catalyst of claim 1 where the promoter metal is present in an amount from about 0.1 to about 10 wt. % of the catalyst as the metal.

8. The catalyst of claim 3 where the binder is present in an amount from about 10 to about 90 wt. % of the catalyst.

9. The catalyst of claim 3 where the catalyst is in the shape of spheres, pills, tablets, extrudates or irregularly shaped particles.

10. The catalyst of claim 3 where the binder is selected from the group consisting of alumina, silica, silica-alumina, titania, zirconia, magnesia, clays, zeolites and mixtures thereof.

11. A process for preparing a catalyst for hydrotreating a hydrocarbon stream, the catalyst comprising a metal phosphide where the metal (M) is selected from the group consisting of Ni, Co, Fe, Mn, Cr, V, Nb, Mo, Ta, W and mixtures thereof, and a promoter metal component where the promoter metal (M1) is selected from the group consisting of Ni, Co, Fe, Mn, Cr, V, Nb, Mo, Ta, W and mixtures thereof, M is not the same as M1, wherein at least a portion of the promoter metal component is dispersed on the metal phosphide and the metal phosphide/promoter metal catalytic component are dispersed onto a refractory inorganic oxide support; the process comprising preparing a metal phosphide by mixing red phosphorus with a M metal compound, a diamine or a polar organic solvent and optionally a surfactant to provide a mixture and reacting the mixture at reaction conditions to provide a metal phosphide; impregnating the metal phosphide with a solution comprising a M1 metal compound and drying to provide a metal phosphide/promoter metal catalytic component and dispersing the catalytic component onto a refractory inorganic oxide support by preparing a slurry of the catalytic component and coating the support with the slurry followed by calcination at a temperature of about 80° C. to about 350° C. for a time of about 2 to about 24 hours.

12. The process of claim 11 where the slurry is prepared by mixing the catalytic component with a solvent and mixing the resultant mixture for a time sufficient to form a slurry.

13. The process of claim 11 where the catalyst is mixed with a binder and formed into a shaped catalyst at forming conditions.

14. The process of claim 13 where the binder is selected from the group consisting of alumina, silica, silica-alumina, titania, zirconia, magnesia, clays, zeolites and mixtures thereof.

15. The process of claim 11 where M is selected from the group consisting of Co, Ni, Fe and mixtures thereof and M1 is selected from the group consisting of Mo, W and mixtures thereof.

16. The process of claim 11 where the diamine is selected from the group consisting of ethylene diamine, 1,3-propylene diamine and mixtures thereof.

17. The process of claim 11 where the surfactant is selected from the group consisting of polyacryl amide, sodium dodecylsulfate, cetyltrimethylammonium bromide and mixtures thereof.

18. The process of claim 11 where the reaction conditions include a temperature of about 80° C. to about 350° C. and a time of about 2 to about 24 hours.

19. A process for preparing a catalyst for hydrotreating a hydrocarbon stream, the catalyst comprising a metal phosphide where the metal (M) is selected from the group consisting of Ni, Co, Fe, Mn, Cr, V, Nb, Mo, Ta, W and mixtures thereof, and a promoter metal component where the promoter metal (M1) is selected from the group consisting of Ni, Co, Fe, Mn, Cr, V, Nb, Mo, Ta, W and mixtures thereof, where M is not the same as M1, and the metal phosphide and promoter metal component are dispersed on a refractory inorganic oxide support; the process comprising preparing a metal phosphide by mixing red phosphorus with a M metal compound, a diamine or a polar organic solvent and optionally a surfactant to provide a mixture and reacting the mixture at reaction conditions to provide a metal phosphide; dispersing the metal phosphide onto a refractory inorganic oxide support by preparing a slurry of the metal phosphide and coating the support with the slurry followed by calcination at a temperature of about 80° C. to about 350° C. for a time of about 2 to about 24 hours; impregnating the metal phosphide/support with a solution comprising a M1 metal compound and drying to provide the catalyst.

20. The process of claim 19 where the slurry is prepared by mixing the metal phosphide with a solvent and mixing the resultant mixture for a time sufficient to form a slurry.

21. The process of claim 19 where the catalyst is mixed with a binder and formed into a shaped catalyst at forming conditions.

22. The process of claim 21 where the binder is selected from the group consisting of alumina, silica, silica-alumina, titania, zirconia, magnesia, clays, zeolites and mixtures thereof.

23. The process of claim 19 where M is selected from the group consisting of Co, Ni, Fe and mixtures thereof and M1 is selected from the group consisting of Mo, W and mixtures thereof.

24. The process of claim 19 where the diamine is selected from the group consisting of ethylene diamine, 1,3-propylene diamine and mixtures thereof.

25. The process of claim 19 where the surfactant is selected from the group consisting of polyacryl amide, sodium dodecylsulfate, cetyltrimethylammonium bromide and mixtures thereof.

26. The process of claim 19 where the reaction conditions include a temperature of about 80° C. to about 350° C. and a time of about 2 to about 24 hours.

27. A process for hydrotreating a hydrocarbon stream comprising sulfur and nitrogen compound contaminants comprising contacting the hydrocarbon stream with a catalyst at hydrotreating conditions thereby removing at least a portion of the contaminants and providing a purified hydrocarbon stream, the catalyst comprising a metal phosphide where the metal (M) is selected from the group consisting of Ni, Co, Fe, Mn, Cr, V, Nb, Mo, Ta, W and mixtures thereof, and a promoter metal component where the metal promoter (M1) is selected from the group consisting of Ni, Co, Fe, Mn, Cr, V, Nb, Mo, Ta, W and mixtures thereof and where M is not the same as M1 and wherein at least a portion of the M1 promoter metal component is present on the M metal phosphide and the metal phosphide/promoter metal component are dispersed onto a refractory inorganic oxide support.

28. The process of claim 27 where the hydrotreating conditions comprise a hydrogen to hydrocarbon ratio of about 0.02 to about 0.04 (wt/wt), a pressure of up to 5.2 MPa, a temperature of about 150° C. to about 400° C. and a liquid hourly space velocity (LHSV) of about 1 to about 2 $hr^{-1}$.

* * * * *